United States Patent
Noguchi

(10) Patent No.: US 9,459,511 B2
(45) Date of Patent: Oct. 4, 2016

(54) MACH-ZEHNDER TYPE OPTICAL MODULATOR, OPTICAL TRANSMISSION/RECEPTION SYSTEM AND CONTROL METHOD OF MACH-ZEHNDER TYPE OPTICAL MODULATOR

(71) Applicant: NEC Corporation, Minato-ku, Tokyo (JP)

(72) Inventor: Hidemi Noguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/394,313

(22) PCT Filed: Apr. 3, 2013

(86) PCT No.: PCT/JP2013/002321
§ 371 (c)(1),
(2) Date: Oct. 14, 2014

(87) PCT Pub. No.: WO2013/161196
PCT Pub. Date: Oct. 31, 2013

(65) Prior Publication Data
US 2015/0110500 A1      Apr. 23, 2015

(30) Foreign Application Priority Data

Apr. 27, 2012    (JP) ................................ 2012-102576

(51) Int. Cl.
*H04B 10/25*         (2013.01)
*H04B 10/54*         (2013.01)
(Continued)

(52) U.S. Cl.
CPC ............. *G02F 1/225* (2013.01); *G02F 1/0121* (2013.01); *G02F 1/0316* (2013.01); *H04B 10/25* (2013.01);
(Continued)

(58) Field of Classification Search
CPC ..... G02F 1/225; G02F 1/0316; H04B 10/25; H04B 10/541

USPC ................................. 398/141, 140, 182, 185
See application file for complete search history.

(56) References Cited

U.S. PATENT DOCUMENTS

| | | | | |
|---|---|---|---|---|
| 5,675,673 A | * | 10/1997 | Skeie ...................... | G02F 1/225 385/2 |
| 6,192,167 B1 | * | 2/2001 | Kissa .................... | G02F 1/0356 385/14 |

(Continued)

FOREIGN PATENT DOCUMENTS

| | | |
|---|---|---|
| CN | 1442967 A | 9/2003 |
| CN | 101578544 A | 11/2009 |

(Continued)

OTHER PUBLICATIONS

International Search Report for PCT Application No. PCT/JP2013/002321, mailed on May 7, 2013.

(Continued)

*Primary Examiner* — Oommen Jacob

(57) ABSTRACT

A Mach-Zehnder type optical modulator according to the present invention is characterized by: that it comprises a beam splitting unit for splitting input light into two component light beams, a first waveguide and a second waveguide for guiding respective ones of the split component light beams, a beam combining unit for combining together the component light beams guided respectively by the first and second waveguides and outputting the combined light, a plurality of electrodes which are formed into electrode pairs as a result of being arranged on the first and second waveguides in a symmetric and parallel manner, and driving units for differentially driving respective ones of the electrode pairs in accordance with the magnitude relationships between the voltage of an input signal and respective ones of threshold voltages set individually for the electrode pairs; and that, by thus being driven differentially, the plurality of electrodes each apply a voltage for modulating the input light to the waveguide on which they are arranged.

9 Claims, 12 Drawing Sheets

(51) Int. Cl.
*G02F 1/01* (2006.01)
*G02F 1/225* (2006.01)
*G02F 1/03* (2006.01)
*G02F 1/21* (2006.01)

(52) U.S. Cl.
CPC ....... *H04B 10/541* (2013.01); *G02F 2001/212* (2013.01); *G02F 2201/126* (2013.01); *G02F 2201/16* (2013.01)

(56) References Cited

U.S. PATENT DOCUMENTS

| | | | |
|---|---|---|---|
| 6,785,434 B2 * | 8/2004 | Castoldi | G02B 6/12 |
| | | | 385/14 |
| 8,320,720 B2 * | 11/2012 | Webster | G02F 1/0121 |
| | | | 385/14 |
| 8,797,198 B2 * | 8/2014 | Ehrlichman | G02F 1/0121 |
| | | | 341/137 |
| 8,849,071 B2 * | 9/2014 | Kissa | G02F 1/225 |
| | | | 385/3 |
| 9,069,193 B2 * | 6/2015 | Sato | G02F 1/0123 |
| 2008/0089634 A1 * | 4/2008 | Mosinskis | G02F 1/0121 |
| | | | 385/3 |
| 2009/0003841 A1 * | 1/2009 | Ghidini | G02F 1/0123 |
| | | | 398/186 |
| 2009/0290830 A1 * | 11/2009 | Mitomi | G02F 1/0356 |
| | | | 385/3 |
| 2012/0081245 A1 | 4/2012 | Ehrlichman et al. | |
| 2012/0134676 A1 * | 5/2012 | Kikuchi | H04B 10/532 |
| | | | 398/65 |
| 2012/0251032 A1 * | 10/2012 | Kato | G02F 1/0327 |
| | | | 385/3 |
| 2013/0176609 A1 * | 7/2013 | Noguchi | H04B 10/5561 |
| | | | 359/238 |
| 2015/0110500 A1 * | 4/2015 | Noguchi | G02F 1/0316 |
| | | | 398/142 |

FOREIGN PATENT DOCUMENTS

| | | |
|---|---|---|
| EP | 1596246 A1 | 11/2005 |
| EP | 2487524 A1 | 8/2012 |
| JP | 2004-247968 A | 9/2004 |
| JP | 2009-231881 A | 10/2009 |
| JP | 2011-147163 A | 7/2011 |
| WO | 2011/043079 A1 | 4/2011 |

OTHER PUBLICATIONS

Extended European Search Report for EP Application No. EP13780870.5 dated on Nov. 27, 2015.
Chinese Office Action for CN Application No. 201380021986.4 dated on Jul. 1, 2016 with English Translation.

* cited by examiner

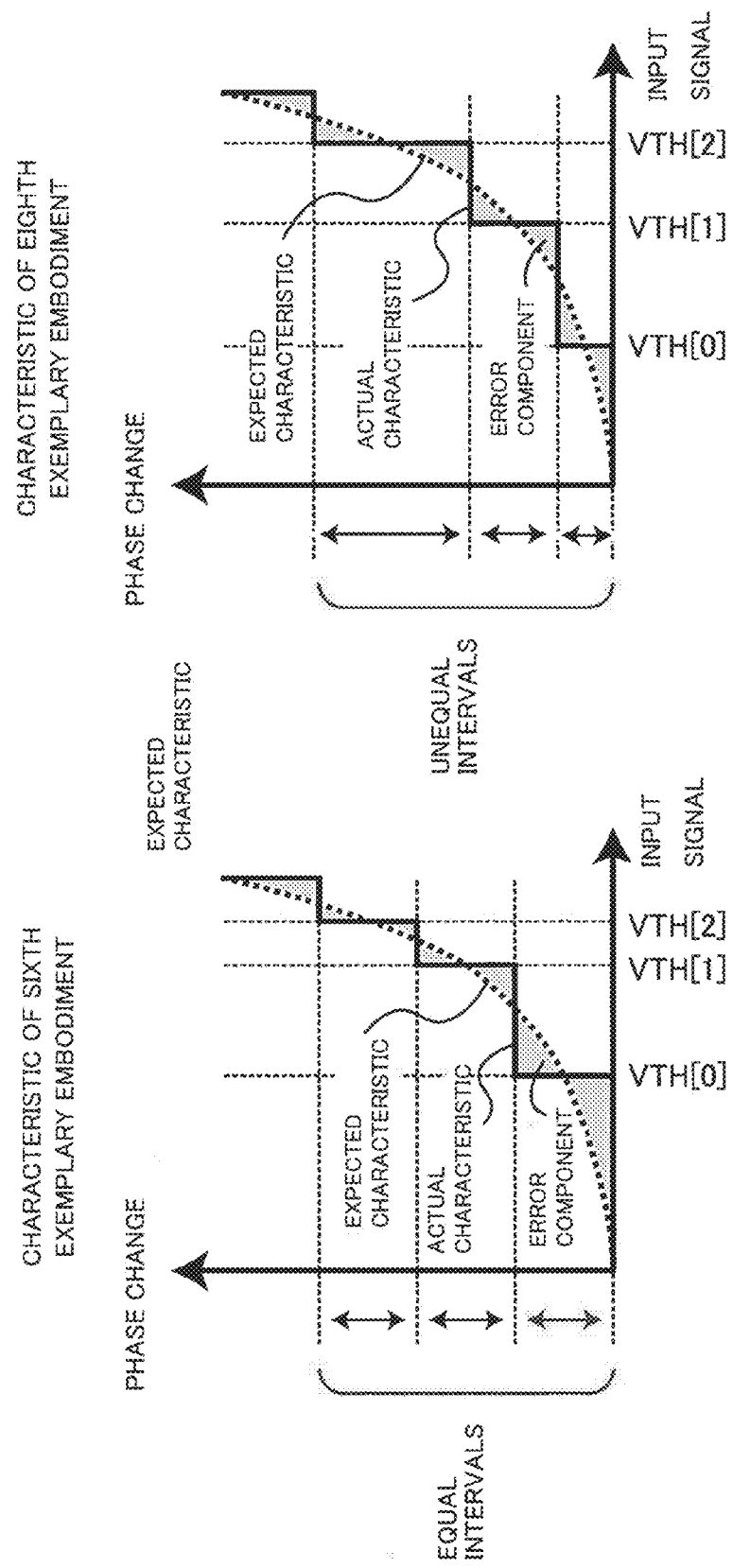

MACH-ZEHNDER TYPE OPTICAL MODULATOR, OPTICAL TRANSMISSION/RECEPTION SYSTEM AND CONTROL METHOD OF MACH-ZEHNDER TYPE OPTICAL MODULATOR

This application is a National Stage Entry of PCT/JP2013/002321 filed on Apr. 3, 2013, which claims priority from Japanese Patent Application 2012-102576 filed on Apr. 27, 2012, the contents of all of which are incorporated herein by reference, in their entirety.

TECHNICAL FIELD

The present invention relates to a Mach-Zehnder type optical modulator, an optical transmission/reception system and a control method of a Mach-Zehnder type optical modulator.

BACKGROUND ART

In accordance with explosive increase in demand for broadband multimedia communication services such as the internet and video delivery, introduction of a high-density wavelength-division multiplexing fiber optic communication system, which has features of longer distance, larger capacity and higher reliability, has been set forward in core and metro networks. Also in subscriber access networks, an optical fiber access service has become in widespread use rapidly. In such communication systems using optical fibers, it is important to reduce the cost for laying optical fibers to be optical transmission lines and to increase the transmission band utilization efficiency for each optical fiber. For this reason, widely used is a wavelength-division multiplexing technology which transmits a plurality of optical signals of different wavelengths by multiplexing them with each other.

In an optical transmitter for the use in a wavelength-division multiplexing fiber optic communication system, there is requirement for an optical modulator which is capable of high-speed optical modulation with small dependence on optical signal wavelength, where an unnecessary optical phase modulated component (when an optical intensity modulation method is used as the modulation method) or an unnecessary optical intensity modulated component (when an optical phase modulation method is used as the modulation method), both causing degradation in the waveform of received light in a case of long-haul signal transmission, is suppressed to the utmost. For such a use, usually used is a Mach-Zehnder (MZ, hereafter) optical intensity modulator incorporating a waveguide type optical phase modulator, which is similar to a waveguide type MZ interferometer.

For increasing the transmission capacity per wavelength channel, from the viewpoints of spectrum utilization efficiency and of tolerance to wavelength dispersion and polarization mode dispersion of an optical fiber, a multi-level optical modulation signal method, which has a narrower optical modulation spectrum bandwidth compared to a usual binary optical intensity modulation method, is advantageous. Further, in a system where longer-haul transmission is required, such as that used for trans-oceanic optical communication, there also arises necessity for a pre-equalization technology which compensates a waveform distortion generated in an optical fiber being the transmission line by applying a distortion of the inverse characteristic at the sending side. To enable application of such multi-level modulation and a pre-equalization technology, the sending side is required to have a function of digital-to-analog converter (DAC) which is capable of generating an optional signal waveform produced by digital signal processing. For example, Patent Document 1 discloses a method which drives an optical modulator of the MZ configuration, where an LN modulator or the like is used, with analog signals using an electrical DAC and a linear amplifier.

To increase the transmission capacity per wavelength channel, improvement in the symbol frequency of data is also needed. For improvement in the symbol frequency of data, the band of a device is an important factor. Taking as an example an optical device generally used in fiber optic communication systems (for example, an optical modulator), its band is restricted by restriction of CR time constant due to mainly the influence of a resistance component R and the capacitance C of the device. Because such an optical device uses interaction between light and an electric field, a required voltage and a capacitance of the device is determined by the electric field strength and the interaction length. It is general that, with increasing the interaction length, the electric field strength per unit length is allowed to be smaller, but the capacitance of the device increases at the same time. Accordingly, in an optical modulator, for example, the power consumption and the extinction characteristic are each in a trade-off relation with the band. As a result, for such an optical device, there is no choice but to make a compromise design with consideration of a trade-off relation such as described above. In this respect, for example, Patent Document 2 proposes a method which solves the trade-off relation between the interaction length and the band. In Patent Document 2, it is proposed to reduce the capacitance by employing a split electrode structure obtained by splitting an electrode into two or more segments along the propagation direction of light and thereby driving the long electrode in a manner of driving its split segments independently in an electrically separated fashion.

CITATION LIST

Patent Literature

[PTL 1] Japanese Patent Application Laid-Open No. 2009-231881
[PTL 2] WO 2011/043079

SUMMARY OF INVENTION

Technical Problem

However, an optical modulator of the MZ configuration has a problem in that the quality of modulated output light is degraded because signal intensity of the output light is nonlinearly related to the amplitude of an input signal. For example, as shown in FIG. 9, the extinction characteristic of an optical modulator of the MZ configuration becomes a sine curve one as a result of applying linear phase modulation in each of the two waveguides. Accordingly, in such an optical modulator of the MZ configuration, it becomes impossible to secure linearity of the output light intensity with respect to the input signal amplitude. This problem similarly arises also in, for example, an optical modulator comprising a plurality of electrodes along the propagation direction of light, such as that described in Patent Document 2.

The present invention has been made in view of the above-described problem, and accordingly, its objective is, with respect to a Mach-Zehnder type optical modulator comprising a plurality of electrodes along the propagation direction of light, to provide a Mach-Zehnder type optical modulator, an optical transmission/reception system and a control method of a Mach-Zehnder type optical modulator, all of which can reduce degradation in the quality of output light.

Solution to Problem

A Mach-Zehnder type optical modulator according to the present invention is characterized by: that the Mach-Zehnder type optical modulator comprises: a beam splitting unit which splits input light into two component beams; a first waveguide and a second waveguide which guide respective ones of the split component beams of the input light; a beam combining unit which combines the component beams of the input light guided by, respectively, the first and second waveguides and then outputs the combined light beam; a plurality of electrodes which are formed into electrode pairs as a result of being arranged on the first and second waveguides in a symmetric and parallel manner; and driving units each of which differentially drives the corresponding one of the electrode pairs in accordance with a magnitude relatioship between the corresponding one of threshold voltages set individually for the electrode pairs and the voltage of an input signal; and that, by thus being driven differentially, the plurality of electrodes each apply a voltage for modulating the input light to the waveguide on which they are arranged.

A control method of a Mach-Zehnder type optical modulator according to the present invention is a method for controlling a Mach-Zehnder type optical modulator, wherein: the Mach-Zehnder type optical modulator comprises: a beam splitting unit which splits input light into two component light beams; a first waveguide and a second waveguide which guide respective ones of the split component beams of the input light; a beam combining unit which combines the component beams of the input light guided by, respectively, the first and second waveguides and then outputs the combined light beam; and a plurality of electrodes which are formed into electrode pairs as a result of being arranged on the first and second waveguides in a symmetric and parallel manner, and the method comprises: differentially driving each of the electrode pairs in accordance with a magnitude relationship between the corresponding one of threshold voltages set individually for the electrode pairs and the voltage of an input signal; and by thus driving the electrode pairs differentially, applying voltages for modulating the input light to the waveguides on which the electrode pairs are arranged.

An optical transmission/reception system according to the present invention includes the above-described Mach-Zehnder type optical modulator, and also comprises an optical transmitter which outputs an optical signal modulated by the Mach-Zehnder type optical modulator, a transmission line on which the optical signal propagates and an optical receiver which receives the optical signal via the transmission line.

Advantageous Effects of Invention

According to the present invention, it becomes possible, with respect to a Mach-Zehnder type optical modulator comprising a plurality of electrodes along the propagation direction of light, to provide a Mach-Zehnder type optical modulator, an optical transmission/reception system and a control method of a Mach-Zehnder type optical modulator, all of which can reduce degradation in the quality of output light.

BRIEF DESCRIPTION OF DRAWINGS

FIG. 12 is a diagram showing phase variation against input signal in cases of performing phase modulation with (a) a scale of uniform steps and (b) a scale of non-uniform steps.

DESCRIPTION OF EMBODIMENTS

Figure 1:
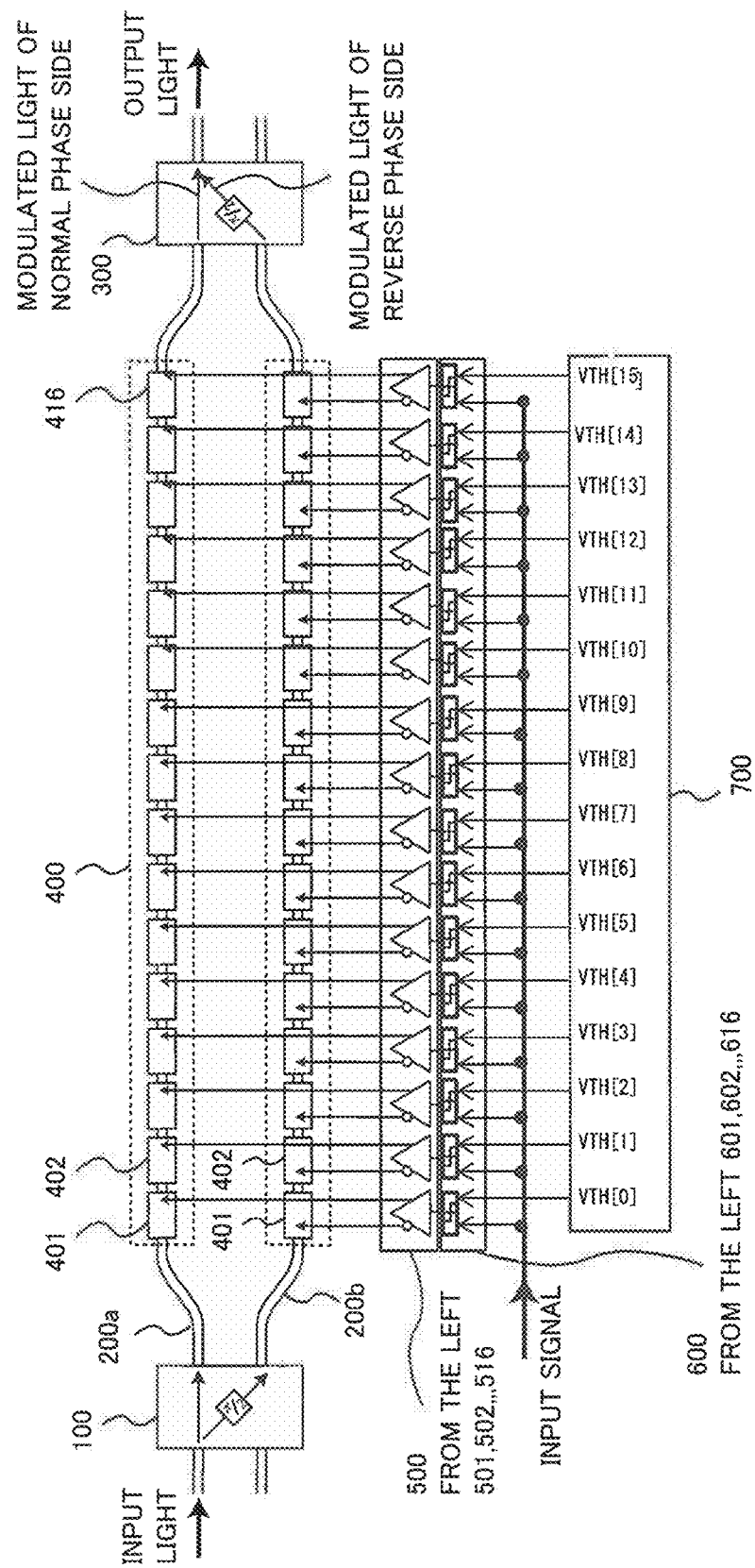
FIG. 1 is a functional block diagram of a Mach-Zehnder type optical modulator according to a first exemplary embodiment.

A configuration of a Mach-Zehnder type optical modulator according to a first exemplary embodiment will be described using FIG. 1.

The Mach-Zehnder type optical modulator comprises a waveguide 200a, a waveguide 200b, a beam splitting unit 100, a beam combining unit 300, two electrode groups 400 for phase modulation, a driving unit group 500 and a comparison unit group 600.

The waveguide 200a and the waveguide 200b are arranged in parallel with each other. The beam splitting unit 100 is arranged on one side of the waveguides 200a and 200b where light is inputted to the waveguides. The beam combining unit 300 is arranged on the other side of the waveguides 200a and 200b where light is outputted from the waveguides.

The two electrode groups 400 are arranged respectively on the waveguides 200a and 200b installed between the beam splitting unit 100 and the beam combining unit 300. In the present exemplary embodiment, each of the two electrode groups 400 is an aggregation of M-number of electrodes 401, 402, . . . and 4M which are arranged in parallel with each other on the corresponding waveguide along the propagation direction of light, and in the present description, M=16 is assumed, as an example.

The beam splitting unit 100 splits light introduced to it, gives a predetermined phase difference with respect to one of the component beams to the other of the split component beams, and then outputs both the one and the other component beams. In the present exemplary embodiment, the one of the component beams outputted from the beam splitting unit 100 is introduced into the waveguide 200a, and the other into the waveguide 200b. Here, the predetermined phase difference may be set to be $\pi/2$, for example, as shown in FIG. 1.

The beam combining unit 300 receives two light beams introduced to it, combines the introduced light beams together, and then outputs the combined light beam. Specifically, receiving two light beams introduced to it, the beam combining unit 300 gives a predetermined phase difference with respect to one of the introduced light beams to the other of the light beams. Subsequently, it combines the one and the other light beams together, and then outputs the light resulting from the combining In the present exemplary embodiment, a light beam guided by the waveguide 200a is introduced into the beam combining unit 300 as the one light beam, and a light beam guided by the waveguide 200b is introduced into the beam combining unit 300 as the other light beam. Here, the predetermined phase difference may be set to be $\pi/2$, for example, as shown in FIG. 1. However, the predetermined phase difference in the beam splitting unit 100 and that in the beam combining unit 300 are not limited to $\pi/2$.

The beam splitting unit 100 and the beam combining unit 300 can be realized by MMI (Multi-Mode Interference), for example.

The driving unit group 500 is an aggregation of driving units 501, 502, . . . and 5M (M=16). The driving units 501, 502, . . . and 516 are correlated, respectively, with the electrodes 401, 402, . . . and 416. The driving units 501, 502, . . . and 516 output electrical signals to respectively correlated ones of the electrodes 401, 402, . . . and 416, in accordance with output signals from respectively correlated ones of comparison units 601, 602, . . . and 616. In this way, the driving unit group 500 drives the electrode groups 400.

In the present exemplary embodiment, each of the driving units 501, 502, . . . and 516 outputs a normal phase voltage to one member electrode of the correlated one of electrode pairs which are formed as those of individual ones of the electrodes 401, 402, . . . and 416 as a result of arranging the electrodes on the waveguides 200a and 200b in a symmetric manner, and outputs a reverse phase voltage to the other member of the electrode pair, and accordingly, the driving units 501, 502, . . . and 516 apply differential voltages to respective ones of the pairs of the electrodes 401, 402, . . . and 416. Via the respective electrical signals inputted from the driving units 501, 502, . . . and 516, the electrodes 401, 402, . . . and 416 apply voltages to the waveguides 200a and 200b.

The comparison unit group 600 is an aggregation of comparison units 601, 602, . . . and 6M (M=16). The comparison units 601, 602, . . . and 616 are correlated respectively with the driving units 501, 502, . . . and 516. Each of the comparison units 601, 602, . . . and 616 compares a threshold voltage set by a control unit 700 with the voltage of an input signal. Then, in accordance with the comparison results, they output digital signals of High or Low to respectively correlated ones of the driving units 501, 502, . . . and 516. For example, one of the electrode groups 400 provided on the waveguide 200a is driven by normal phase output signals from the driving unit group 500, and the other of the electrode groups 400 provided on the waveguide 200b is driven by the reverse phase output signals from the driving unit group 500. In this way, the driving unit group 500 performs push-pull driving (differential driving) of the electrode groups 400.

The control unit 700 sets threshold voltages to the comparison unit group 600 such that the intensity of output light becomes equal to a desired value. For example, input signals are connected to input terminals of the comparison units 601 to 616, and the control unit 700 is connected to reference voltage terminals, of the comparison units 601 to 616, to which the threshold voltages are set. The control unit 700 applies optional threshold voltages (VTH[0] to VTH[15]) respectively to the comparison units 601 to 616 individually. In this way, the threshold voltages of the comparison units 601 to 616 are set.

A general optical modulator of the MZ configuration performs phase modulation of light passing beneath an electrode by driving the single electrode with an analog signal. On the other hand, in the Mach-Zehnder type optical modulator according to the first exemplary embodiment, the driving unit group 500 outputs digital signals of High or Low to the electrode groups 400 in accordance with output signals from the comparison unit group 600. In this way, phase modulation of light passing beneath the electrode groups 400 is performed. That is, only electrodes given a High signal participate in the phase modulation of the light, and electrodes given a Low signal do not. As a result, phase modulation is performed in accordance with a value M corresponding to the number of comparison units 6Ms whose comparison result is High, and accordingly, phase modulation with a scale of M steps can be realized. The remaining operations are the same as that of the general optical modulator of the MZ configuration, and accordingly, their descriptions will be omitted here.

Figure 10:
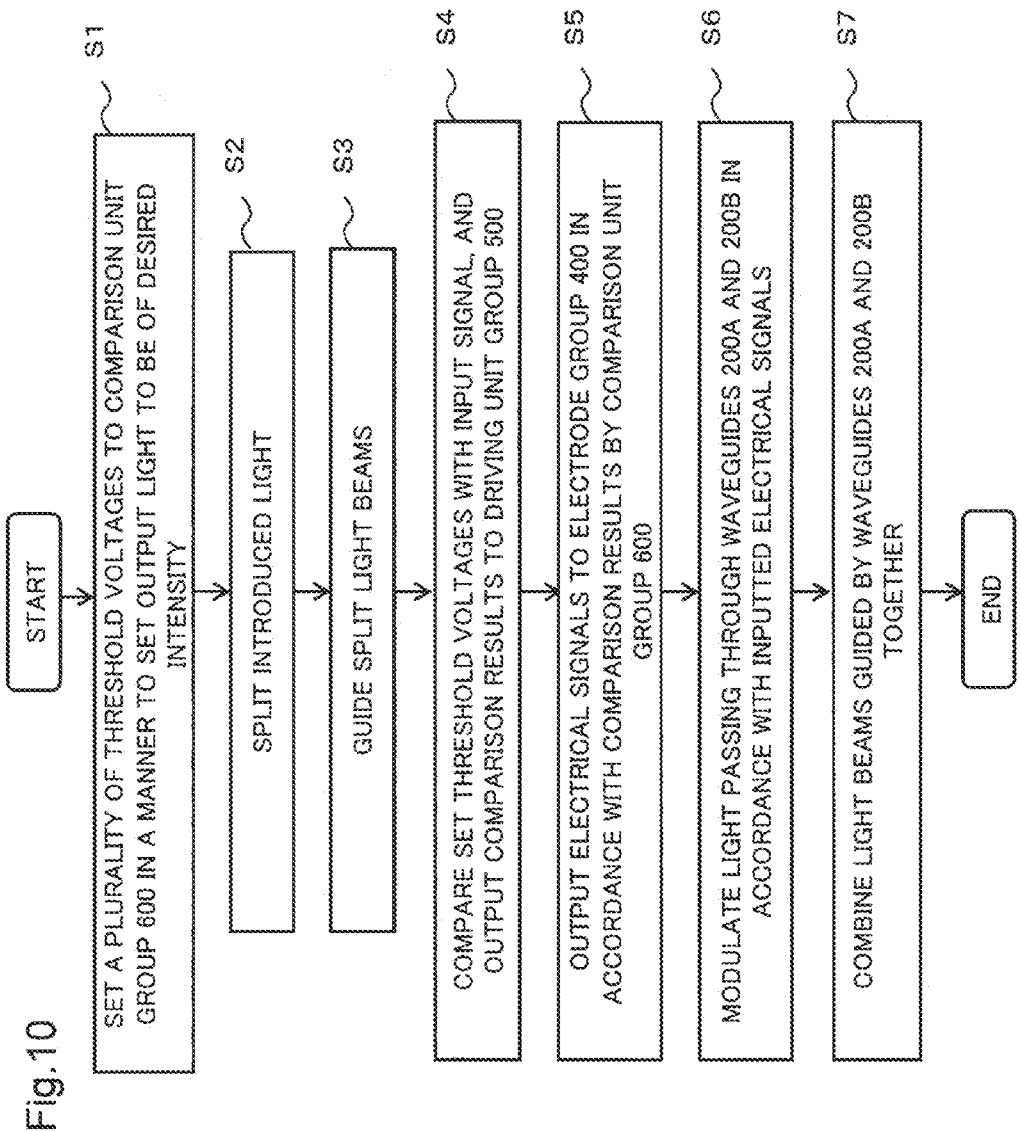
FIG. 10 is a flow chart showing operation of the Mach-Zehnder type optical modulator according to the first exemplary embodiment.

Next, operation of the Mach-Zehnder type optical modulator according to the first exemplary embodiment will be described, using a flow chart in FIG. 10.

First, the control unit 700 sets a plurality of threshold voltages respectively to the comparison units 601 to 616 of the comparison unit group 600 such that the intensity of output light becomes a desired value (S1). Next, the beam splitting unit 100 splits light introduced to it (S2). The waveguides 200a and 200b guide thus spilt component light beams (S3). The comparison unit group 600 compares the voltage of an input signal with the threshold voltages set as above, and outputs the comparison results to the driving unit group 500 (S4). In accordance with the results of comparison by the comparison unit group 600, the driving unit group 500 outputs electrical signals to the electrode groups 400 (S5). In accordance with the inputted electrical signals, the electrode groups 400 modulate the light beams passing through the waveguides 200a and 200b (S6). The beam combining unit 300 combines together the light beams guided by the waveguides 200a and 200b, and outputs the combined light as output light (S7).

Figure 3:
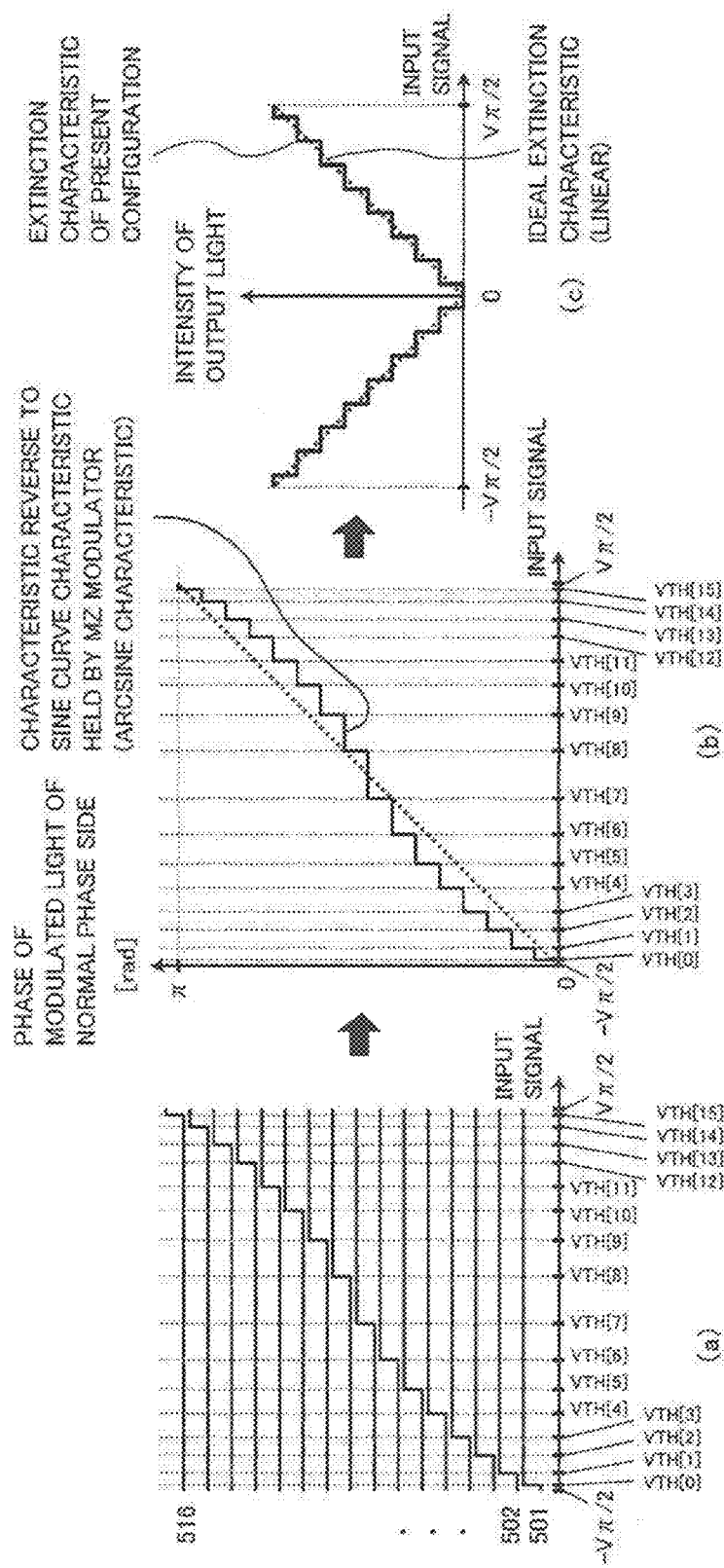
FIG. 3 is an explanatory diagram showing operation of a comparison unit group with respect to an input signal, the phase of modulated light on the normal phase side as a function of input signal voltage, and a relationship between the voltage of an input signal and the intensity of output light.

Next, using FIG. 3, it will be described that the intensity of output light is controllable in the optical modulator of the present exemplary embodiment. A (a) of FIG. 3 is a diagram showing an example of a relation between output signals of the driving units 501 to 516 and the input signal (only the side of normal phase output signal is shown). Here, assumed is a case of increasing the input signal from $-V\pi/2$ to $+V\pi/2$.

At times the voltage of the input signal steps over respective ones of the threshold voltages VTH[0] to VTH[15] set by the control unit 700, respectively corresponding ones of the driving units 501 to 516 sequentially become in a High state in response to output signals from the comparison units 601 to 616. Here, it is assumed that $V\pi$ corresponds to a voltage to cause $\pi$ radian (180 degrees) phase rotation in one of the waveguides of the related MZ optical modulator. Also assumed is that the High voltage of the driving unit group 500 is set at $V\pi/(M-1)$ ($V\pi/15$ in the example of this figure).

In that case, when the threshold voltages VTH[0] to VTH[15] are distributed at equal intervals between $-V\pi/2$ and $+V\pi/2$, it is possible to perform phase modulation with a 16-step scale where the phase changes linearly with the voltage of the input signal. On the other hand, in the Mach-Zehnder type optical modulator according to the first exemplary embodiment, the threshold voltages VTH[0] to VTH[15] are not distributed at equal intervals, but the control unit 700 sets the plurality of threshold voltages at values different from each other such that the intensity of output light of the Mach-Zehnder type optical modulator becomes a desired value.

Here, it is preferable to distribute setting values of the threshold voltages non-uniformly. Here, the non-uniform distribution means a distribution in which the setting values increase not at equal intervals when lined up in ascending order. For example, they are set to increase in a curved fashion when lined up in ascending order. By doing that way, it becomes possible to cause the extinction characteristic of the Mach-Zehnder type optical modulator and the characteristic of a phase modulation amount given in the waveguide cancel out each other, and accordingly to perform intensity modulation under a condition with improved linearity between the input signal amplitude and the output light intensity.

More preferably, the control unit 700 sets the threshold voltages VTH[0] to VTH[15] such that the relation between the (total) amplitude of electrical signals outputted by the driving unit group 500 and the phase change given by the electrode groups 400 becomes of an arcsine characteristic. For example, the threshold voltages are set such that, when their setting values are lined up in ascending order, the relation between the threshold voltages and their variation amount becomes of an upward convex function. As shown in a (b) of FIG. 3, as a result of thus distributing the threshold voltages VTH[0] to VTH[15] non-uniformly, the total characteristic of the phase change becomes that of an arcsine curve with a 16-step scale.

Figure 9:
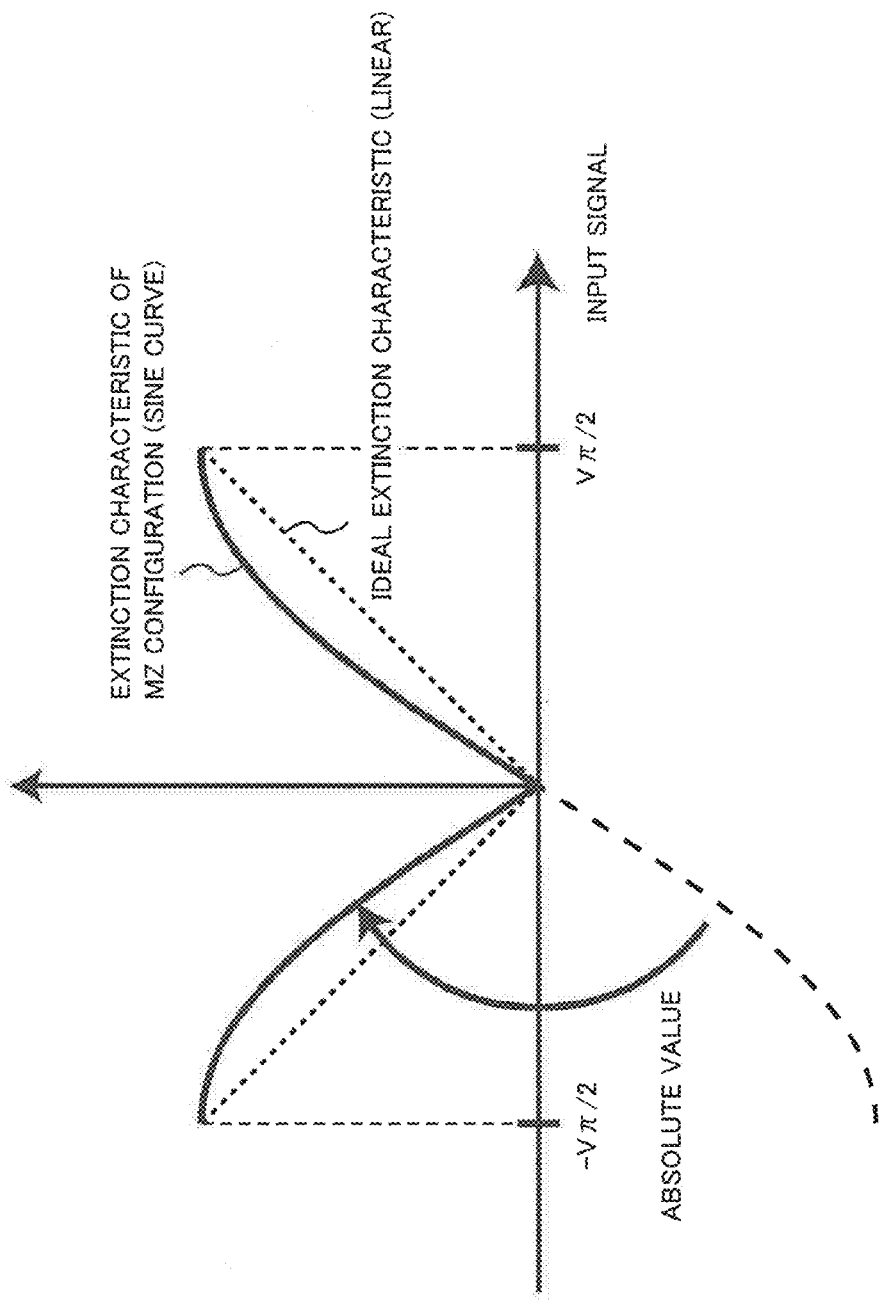
FIG. 9 is a diagram showing a relationship between input signal voltage and output light intensity, in a related Mach-Zehnder type optical modulator.

On the other hand, as described above in the Technical Problem section with reference to FIG. 9, when linear phase modulation is applied in each of the waveguides in a Mach-Zehnder type optical modulator, the extinction characteristic becomes a sine curve one.

That is, the total phase modulation amount induced by the electrode group 400 on the side of the waveguide 200b becomes of a characteristic obtained by turning that of the (b) of FIG. 3 upside down, where the total phase modulation amount varies from $\pi$ to 0 with the increase of the input signal from $-V\pi/2$ to $+V\pi/2$. As a result, the sine curve characteristic being the extinction characteristic of when the light beams are combined by the beam combining unit 300 and the above-described arcsine curve characteristic of the phase modulation amount cancel out each other, and accordingly, the intensity of output light comes to have a linear characteristic such as shown in a (c) of FIG. 3.

By optionally setting the threshold voltages in that way, a Mach-Zehnder type optical modulator of any extinction characteristic can be realized. As a result, it becomes possible to obtain a desired intensity of output light by controlling the amplitude of the input signal, and accordingly to reduce degradation in the quality of output light.

Although the threshold voltages VTH[0] to VTH[15] have been described, in FIG. 3, to be VTH[0]<VTH[1]< . . . <VTH[15] as an example, there is no restriction on the magnitude relationships among VTH[0] to VTH[15], and their magnitudes may be set in a random order.

Further, although a case of obtaining output light with a 16-step scale has been described in the first exemplary embodiment for simplifying the description, the number of split electrodes may be increased. By further increasing the number of steps of the scale, the quantization noise can be reduced, and it accordingly becomes possible to perform a highly accurate modulation closer to ideal.

A second exemplary embodiment will be described using FIG. 2.

Figure 2:
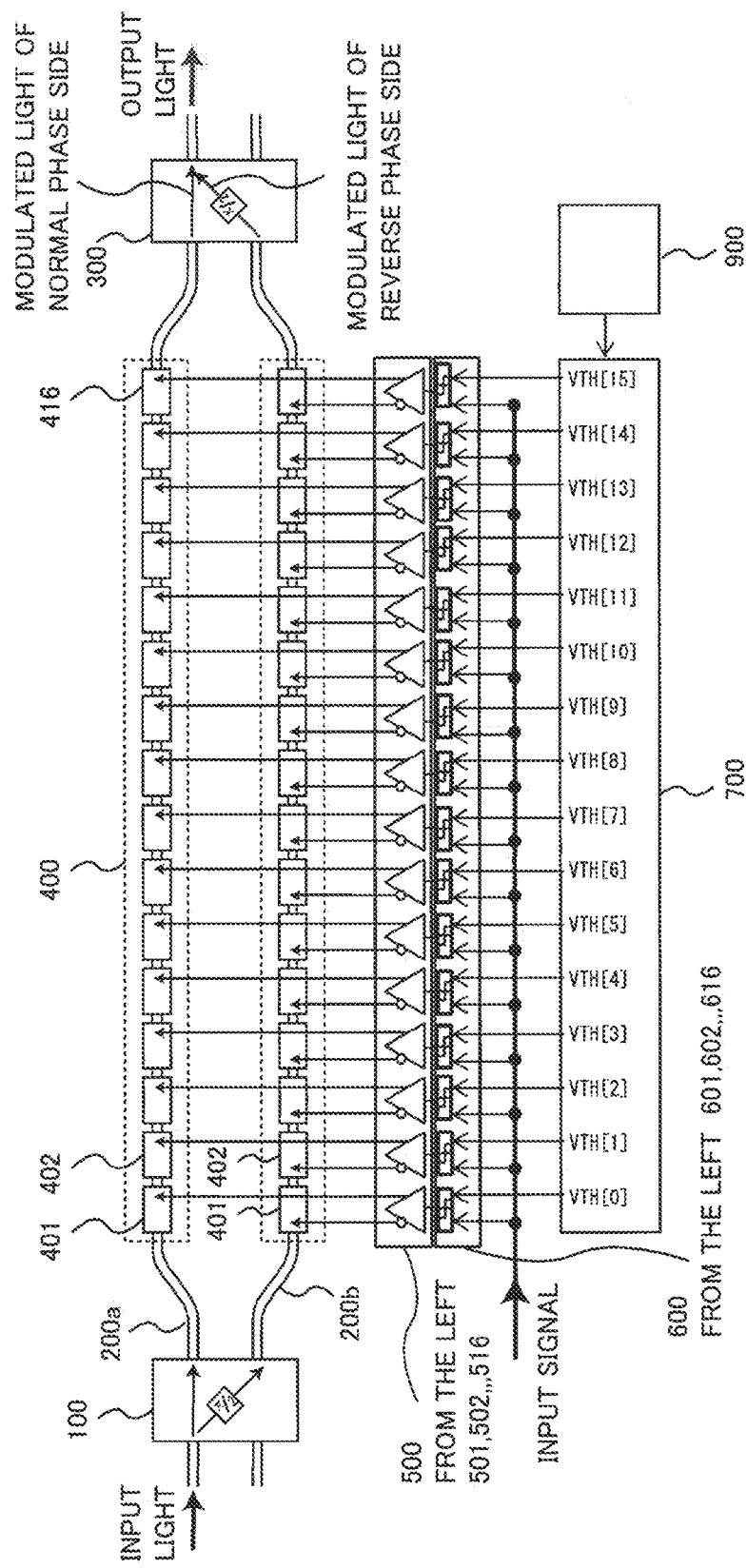
FIG. 2 is a functional block diagram of a Mach-Zehnder type optical modulator according to a second exemplary embodiment.

A Mach-Zehnder type optical modulator according to the second exemplary embodiment is different from the Mach-Zehnder type optical modulator described in the first exemplary embodiment in that, as shown in FIG. 2, it comprises a threshold voltage table 900.

The threshold voltage table 900 stores threshold voltages which are to be set to the comparison unit group 600 by the control unit 700. Then, in accordance with control signals inputted from the threshold voltage table 900, the control unit 700 determines threshold voltages to be set to the comparison unit group 600. The control signals may be either analog signals or digital signals.

Figure 4:
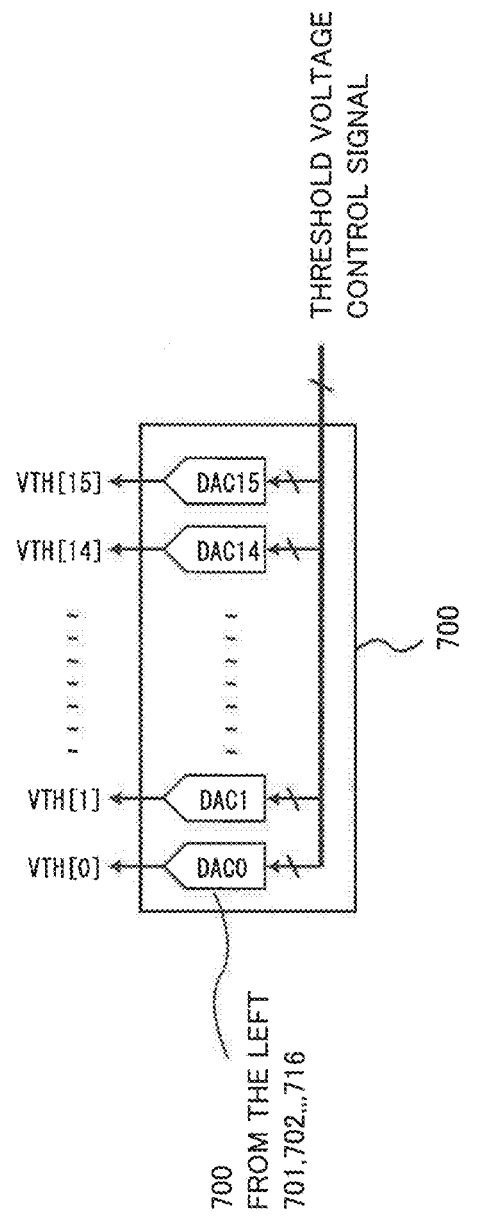
FIG. 4 is a functional block diagram of a control unit 700 according to a third exemplary embodiment.

A third exemplary embodiment will be described using FIG. 4.

A Mach-Zehnder type optical modulator according to the third exemplary embodiment is a modified example of the Mach-Zehnder type optical modulator according to the second exemplary embodiment. Referring to FIG. 4, in the Mach-Zehnder type optical modulator according to the third exemplary embodiment, the control unit 700 comprises a DAC (Digital-to-Analog Converter) group.

DACs 701, 702, . . . and 716 are correlated, respectively, with the comparison units 601, 602, . . . and 616. On receiving the control signals inputted from the threshold voltage table 900, the DACs 701, 702, . . . and 716 of the control unit 700 convert respective ones of the control signals into digital signals. Then, the DACs 701, 702, . . . and 716 output the electrical signals after the conversion to the comparison unit group 600 as voltages for threshold value setting. By using highly accurate DACs with high resolution, it becomes possible to control the threshold voltages with higher accuracy. The remaining operations are the same as that in the second exemplary embodiment, and accordingly, their descriptions will be omitted here.

Figure 5:
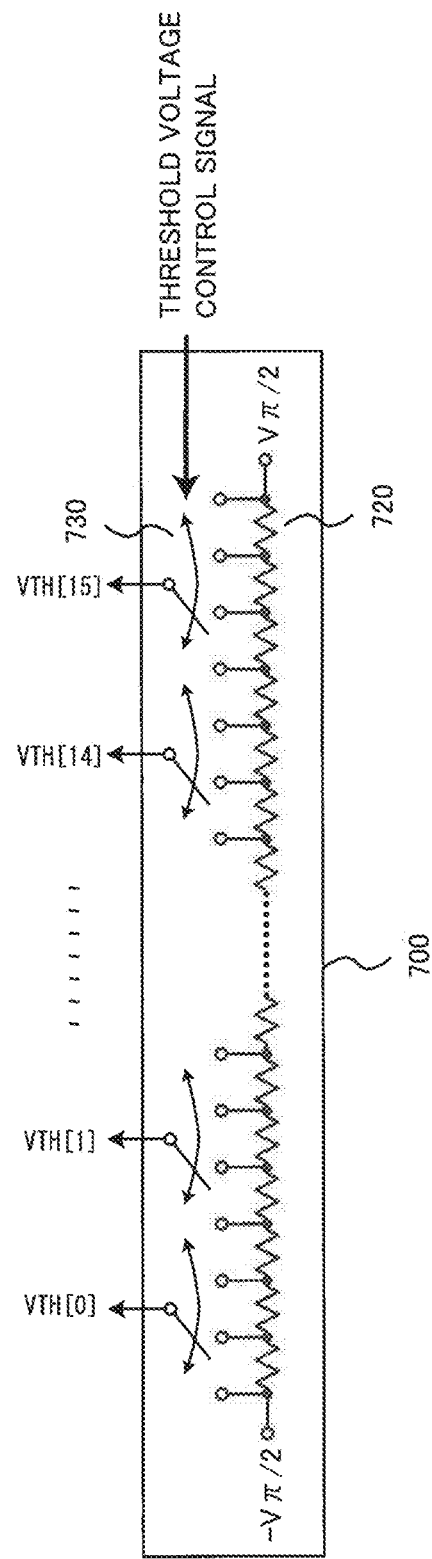
FIG. 5 is a functional block diagram of a control unit 700 according to a fourth exemplary embodiment.

A fourth exemplary embodiment will be described using FIG. 5.

A Mach-Zehnder type optical modulator according to the fourth exemplary embodiment is another modified example of the Mach-Zehnder type optical modulator according to the second exemplary embodiment. Referring to FIG. 4, in the Mach-Zehnder type optical modulator according to the fourth exemplary embodiment, the control unit 700 comprises a resistance dividing circuit 720 and switches 730.

One end of the resistance dividing circuit 720 is connected to a predetermined voltage source, and the other end is grounded, for example. A plurality of intermediate taps are drawn out from intermediate points of respective resistors of the resistance dividing circuit 720, and by switching between them using the switches 730, the threshold voltages VTH[0] to VTH[15] are generated. Switching destinations for the switches 730 are selected in accordance with the control signals from the threshold voltage table 900.

Also in this example, it becomes possible to set optional threshold values and accordingly to perform optional adjustment of the extinction characteristic. The remaining operations are the same as that in the second exemplary embodiment, and accordingly, their descriptions will be omitted here.

Figure 6:
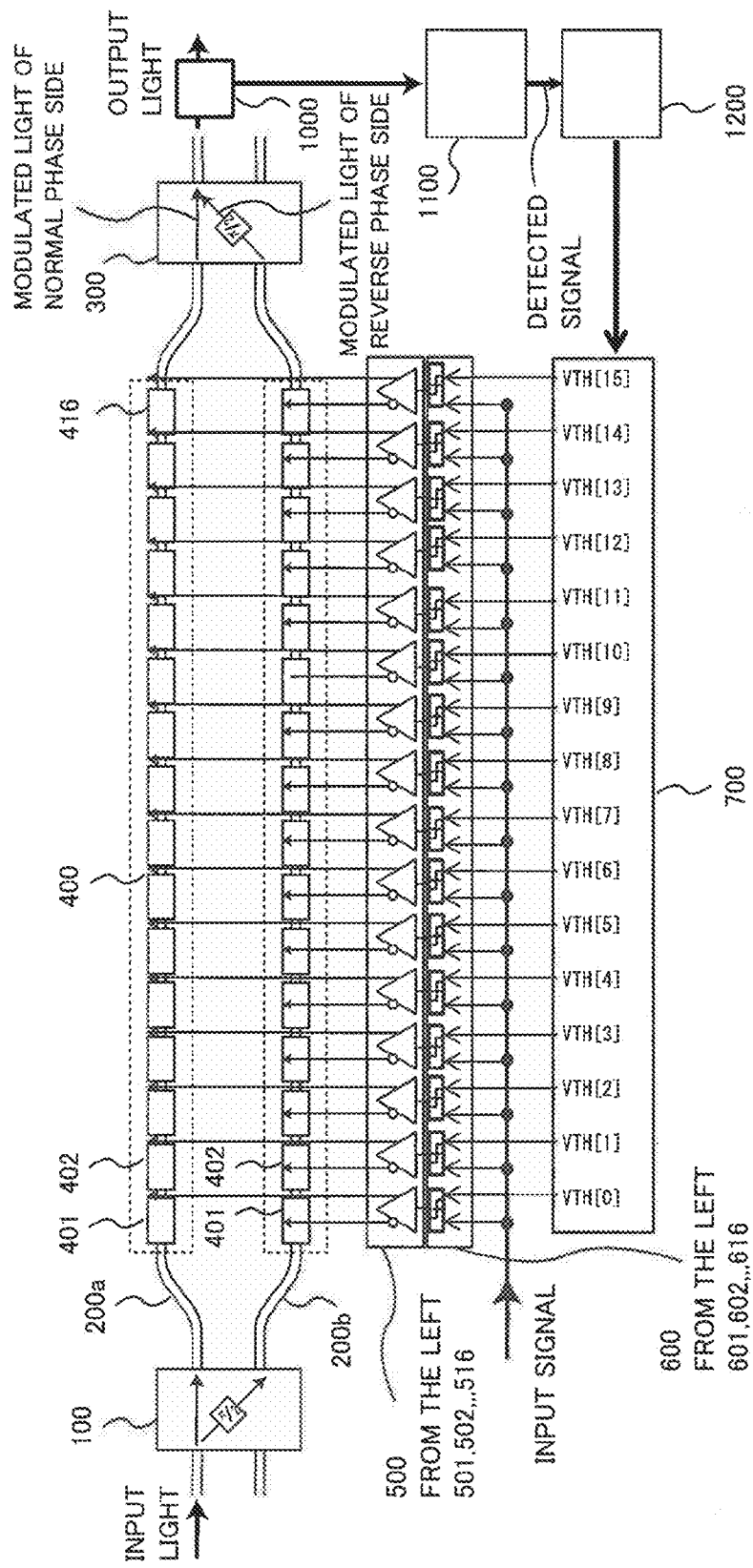
FIG. 6 is a functional block diagram of a Mach-Zehnder type optical modulator according to a fifth exemplary embodiment.

A fifth exemplary embodiment will be described using FIG. 6.

A Mach-Zehnder type optical modulator according to the fifth exemplary embodiment is one obtained by further arranging a branching unit 1000, a detection unit 1100 and a determination unit 1200 into the Mach-Zehnder type optical modulator according to the first exemplary embodiment.

The branching unit 1000 causes part of output light outputted from the beam combining unit 300 to branch from the output light, and outputs the branch light to the detection unit 1100.

The detection unit 1100 receives the branch light separated from the output light by the branching unit 1000, and accordingly detects the intensity of the output light. Then, the detection unit 1100 outputs a detection signal according to the output light intensity to the determination unit 1200. The detection unit 1100 can be realized by, for example, a photoelectric conversion means such as a PD (Photodiode).

On the basis of the detection signal, the determination unit 1200 determines values of the threshold voltages VTH[0] to VTH [15] such that the intensity of output light becomes equal to a desired value. Then, the determination unit 1200 outputs the determined values to the control unit 700 as the control signals.

With the present configuration, adjustment of the threshold voltages VTH[0] to VTH [15] can be performed in combination with detection of the output light intensity. Accordingly, the relation between the output light intensity and the amplitudes of output signals (from the comparison units) can be adjusted more precisely.

Figure 7:
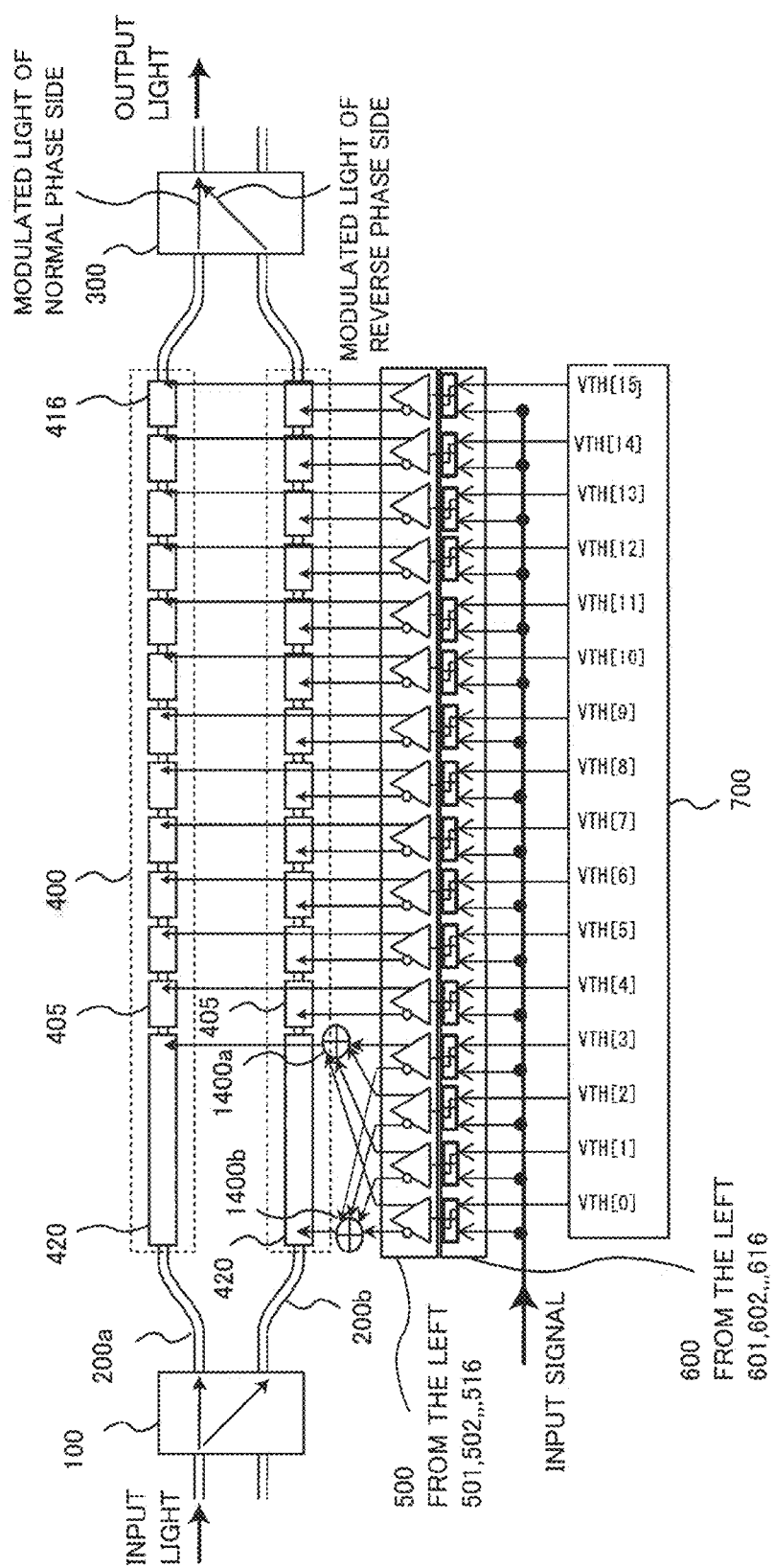
FIG. 7 is a functional block diagram of a Mach-Zehnder type optical modulator according to a sixth exemplary embodiment.

A sixth exemplary embodiment will be described using FIG. 7.

A Mach-Zehnder type optical modulator according to the sixth exemplary embodiment is one obtained by further arranging adding units 1400a and 1400b into the Mach-Zehnder type optical modulator according to the first exemplary embodiment, and by arranging electrodes 420 in place of the electrodes 401, 402, 403 and 404.

The adding units 1400a and 1400b each derive a sum of output signals of the driving units 501, 502, 503 and 504, and outputs the sum. Because the driving unit group performs push-pull driving in the present example, the adding unit 1400a derives the sum of normal phase output signals of the driving units 501, 502, 503 and 504, and outputs the sum to the electrode 420 arranged on the waveguide 200a. On the other hand, the adding unit 1400b derives the sum of reverse phase output signals of the driving units 501, 502, 503 and 504, and outputs the sum to the electrode 420 arranged on the waveguide 200b.

In the present exemplary embodiment, the electrodes 420 each have a length equal to the sum of the lengths of the electrodes 401, 402, 403 and 404 in the longitudinal direction. The electrodes 420 apply voltages, respectively according to the electrical signals outputted by the adding units 1400a and 1400b, to the waveguides 200a and 200b.

The remaining operations are the same as that in the first exemplary embodiment, and accordingly, their descriptions will be omitted here In the present exemplary embodiment, the Mach-Zehnder type optical modulator comprises the addition units 1400a and 1400b, each of which derives a sum of output signals of the plurality of driving units, and the electrodes 420 which, in accordance with electrical signals of a multi-step scale (4-step scale, in the present case) outputted by the adding units 1400a and 1400b, apply voltages to waveguides 200a and 200b. As a result, multi-step scale modulation using a single electrode becomes possible, and accordingly, the number of electrodes can be reduced.

Although the above description has been given assuming that, in the present exemplary embodiment, the electrodes 420 each have a length equal to the sum of the lengths of the electrodes 401, 402, 403 and 404 in the longitudinal direction, the electrodes 420 each may have a length equal to the sum of the lengths of two or five or more electrodes in the longitudinal direction. In that case, it is necessary to change output signals, of corresponding ones of the driving units 501, 502, . . . and 516, of which the adding units 1400a and 1400b each derive a sum, in accordance with the length of the electrodes 420.

Figure 8:
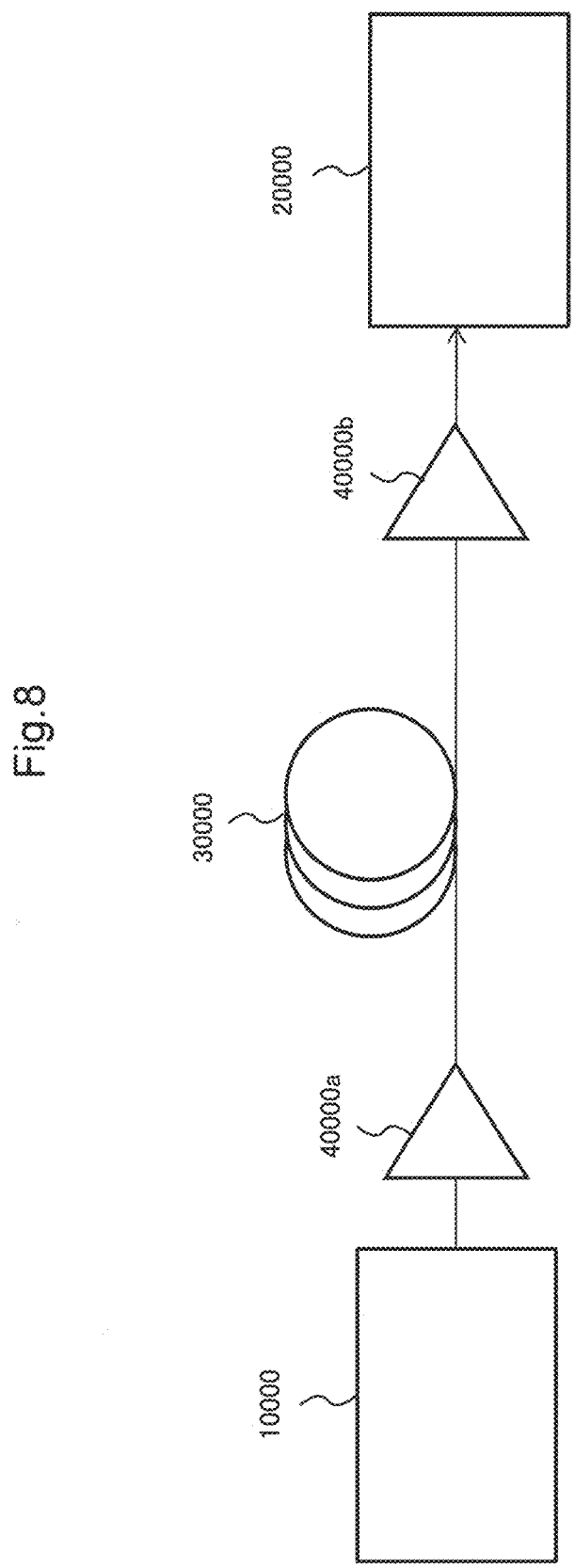
FIG. 8 is a functional block diagram of an optical transmission/reception system according to a seventh exemplary embodiment.

An optical transmission/reception system according to a seventh exemplary embodiment will be described using FIG. 8.

The optical transmission/reception system is an optical transmission/reception system employing an optical transmitter comprising any one the Mach-Zehnder type optical modulators presented in the first to sixth exemplary embodiments described above. A configuration of the optical transmission/reception system according to the seventh exemplary embodiment is shown in FIG. 8.

The optical transmission/reception system comprises an optical transmitter 10000, an optical receiver 20000, an optic fiber 30000 to be a transmission line, and optical amplifiers 40000a and 40000b.

The optical transmitter 10000 comprises any one of the Mach-Zehnder type optical modulators according to the first to sixth exemplary embodiments, and outputs, as an optical signal, a QPSK optical signal having been modulated by Quadrature Phase Shift Keying (hereafter, described as QPSK), for example.

The optical transmitter 10000 and the optical receiver 20000 are optically connected with each other by the optical fiber 30000, through which the QPSK optical signal propagates. The optical amplifiers 40000a and 40000b are each inserted at an intermediate point of the optical fiber 30000, and they amplify the QPSK optical signal propagating there. The optical receiver 20000 demodulates the QPSK optical signal into an electrical signal.

With the above-described configuration, the optical transmission/reception system can perform optical signal transmission using the optical transmitter 10000.

Figure 11:
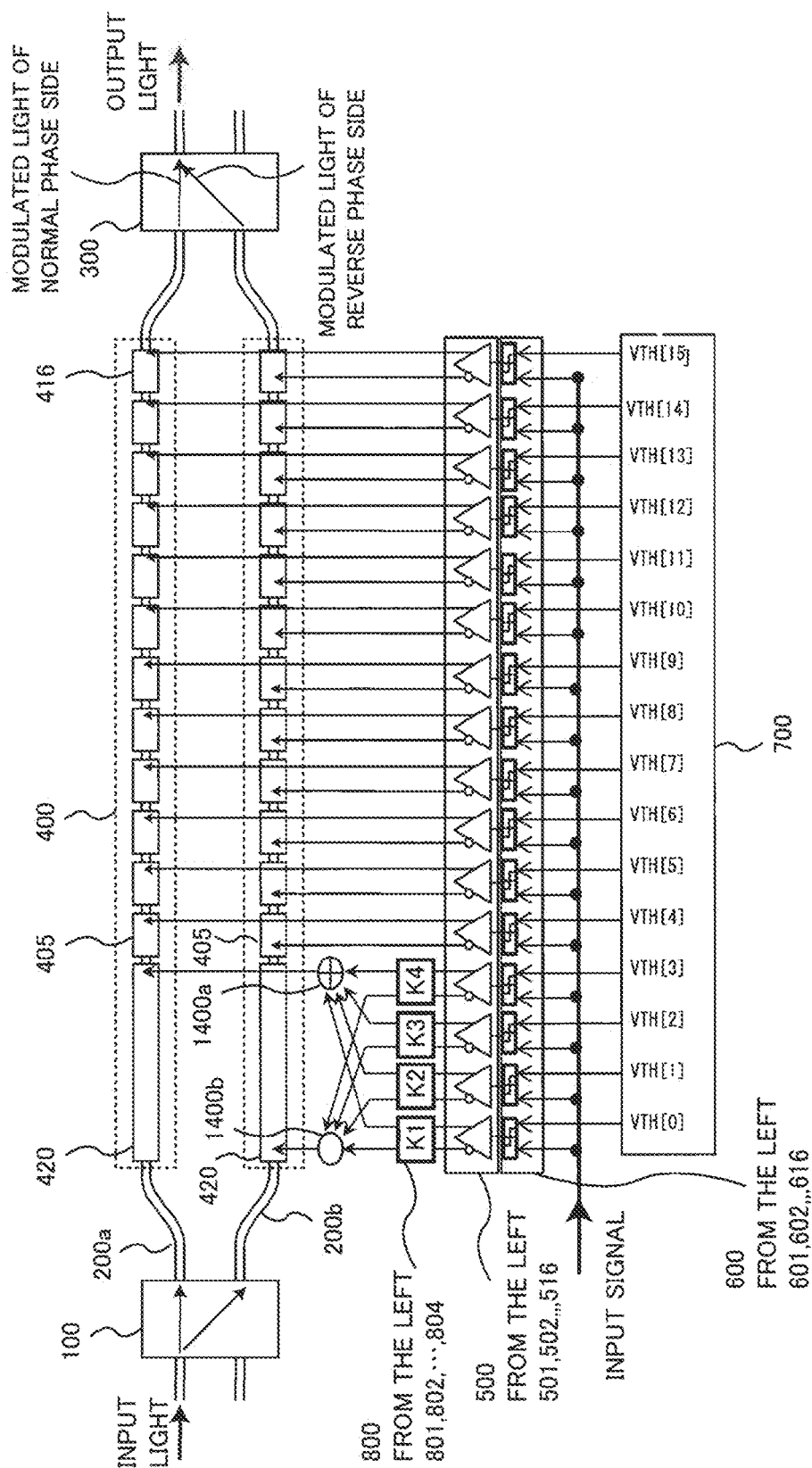
FIG. 11 is a functional block diagram of a Mach-Zehnder type optical modulator according to an eighth exemplary embodiment.

An eighth exemplary embodiment will be described using FIG. 11.

A Mach-Zehnder type optical modulator according to the eighth exemplary embodiment is that obtained by further arranging an amplitude adjustment unit group 800 into the Mach-Zehnder type optical modulator according to the sixth exemplary embodiment.

The amplitude adjustment unit group 800 includes amplitude adjustment units 801, 802, 803 and 804 as its constituent elements. The amplitude adjustment units 801, 802, 803 and 804 have functions to receive output signals of, respectively, the driving units 501, 502, 503 and 504 and to have their amplitudes adjusted optionally from the outside. Specifically, amplitude adjustments with coefficients K1 to K4 are performed with respect to respective ones of the driving units 501, 502, 503 and 504, where the coefficients K1 to K4 are optionally set from the outside. The remaining operations are the same as that in the sixth exemplary embodiment, and accordingly, their descriptions will be omitted here.

In the present exemplary embodiment, signals whose amplitudes have been optionally adjusted respectively by the amplitude adjustment units 801, 802, 803 and 804 are summed up by the adding units 1400*a* and 1400*b*, and accordingly, the signals drive the electrodes 420 in the form of a signal of a 4-step scale having four amplitude levels, into which they have been converted. The difference from the sixth exemplary embodiment also performing driving with a signal of a multi-step scale is that, in contrast to that output signals of the adding units 1400*a* and 1400*b* in the sixth exemplary embodiment are each a multi-step scale signal having equally-spaced amplitude levels, output signals of the adding units in the present exemplary embodiment are each a multi-step scale signal (4-step scale, in the present example) having unequally-spaced amplitude levels.

The advantage of driving the electrodes 420 with signals of a scale of non-uniform steps is that, by appropriately selecting the coefficients K1 to K4 of the amplitude adjustment units in accordance with a desired variation amount of phase modulation, step intervals of the scale can be determined in a non-uniform fashion individually for a region requiring a highly accurate phase modulation of an input signal and for a region allowing coarse phase modulation.

FIG. 12 is a diagram where a case of performing phase-modulation with a uniform step scale is compared with that with a non-uniform step scale. A (a) of FIG. 12 shows a situation of phase modulation (with a uniform step scale) obtained in the sixth exemplary embodiment, and a (b) of FIG. 12 shows that of phase modulation (with a non-uniform step scale) obtained in the present exemplary embodiment. Phase modulation with a nonlinear characteristic against input signal is similarly obtained in both of the (a) and the (b) of FIG. 12, but in contrast to that the variation in the direction of phase change occurs with a uniform step scale in the characteristic in the sixth exemplary embodiment, it occurs with a non-uniform step scale in the present exemplary embodiment. As a result, compared to the characteristic of a uniform step scale shown in the (a) of FIG. 12, the characteristic of a non-uniform step scale shown in the (b) of FIG. 12 becomes a phase modulation characteristic with higher accuracy whose quantization error with reference to an ideal characteristic is small. Thus, according to the present exemplary embodiment, it becomes possible to realize phase modulation with higher accuracy by the effect of giving a non-uniform step scale. It is obvious that the Mach-Zehnder type optical modulator according to the eighth exemplary embodiment can also be installed in the optical transmitter of the optical transmission/reception system according to the seventh exemplary embodiment.

Here, the present invention is not limited to the above-described exemplary embodiments, but may be appropriately modified within the range not departing from the spirit.

For example, the Mach-Zehnder type optical modulators in the above-described exemplary embodiments have been described assuming them to be of a 16-step scale, but they have been presented only as examples. Specifically, by increasing the number of the electrodes, an optical modulator capable of modulation with higher accuracy can be configured.

Further, although the electrodes 401, 402, 403 and 404 are combined together and thereby configured as the single long electrode 420 in the sixth and eighth exemplary embodiments, it is not the only limited case. That is, a greater number of electrodes may be combined into a plurality of long electrodes to have a configuration using them. It is obvious that, in that case, it is necessary to increase the number of components corresponding to the adding units 1400*a* and 1400*b* and to the amplitude adjustment units 801 to 804 in accordance with the number of the long electrodes.

Further, although a description has been given of an example of controlling the threshold voltages by detecting the intensity of output light, it is only an example. For example, the configuration may be such that the optical receiver 20000 performs detection of the intensity of output light and then feeds back information about the light intensity to the optical transmitter 10000.

Here, part or the whole of the above-described exemplary embodiments may be described also as, but are not limited to, the following supplementary notes.

(supplementary note 1) A Mach-Zehnder type optical modulator which: comprises a beam splitting unit for splitting input light into two component light beams, a first and a second waveguides for guiding respective ones of the split component light beams, and a beam combining unit for combining together the component light beams guided respectively by said first and second waveguides and outputting the combined light; is provided with a plurality of electrodes for applying voltages for modulation of one or both of the component light beams guided respectively by said first and second waveguides, along said first and second waveguides; and comprises a plurality of driving units which are connected to respective ones of said electrodes and apply predetermined voltages to respectively connected said electrodes, in accordance with magnitude relationships between the voltage of an input signal and respective ones of threshold values set at different values.

(supplementary note 2) The Mach-Zehnder type optical modulator according to supplementary note 1, wherein said threshold values set at different values are set to have a mutual relationship where they do not increase at equal intervals when they are lined up in ascending order.

(supplementary note 3) The Mach-Zehnder type optical modulator according to supplementary notes 1 or 2, wherein said threshold values set at different values are set in a manner to set the relationships between said amplitude of an input signal and phases given respectively to the component light beams guided by said first and second waveguides to be of arcsine curves.

(supplementary note 4) The Mach-Zehnder type optical modulator according to any one of supplementary notes 1 to 3, wherein said threshold values set at different values are set to be of a mutual relationship corresponding to a characteristic obtained when the threshold voltages are represented by the horizontal axis and the variation amounts of threshold value are by the vertical axis shows an upward convex curve, when said threshold voltages are lined up in ascending order.

(supplementary note 5) The Mach-Zehnder type optical modulator according to any one of supplementary notes 1 to 3, further comprising a branching unit for splitting said output light, a detection unit for detecting the intensity of one of the light beams split by said branching unit, a determination unit for determining said plurality of threshold voltages on the basis of the light intensity obtained by said detection, and a control unit for controlling said plurality of threshold voltages on the basis of said determination made by said determination unit.

(supplementary note 6) The Mach-Zehnder type optical modulator according to supplementary note 5, further comprising a storage unit for storing said plurality of threshold voltages, wherein said control unit controls said plurality of threshold voltages on the basis of information stored in said storage unit.

(supplementary note 7) The Mach-Zehnder type optical modulator according to any one of supplementary notes 1 to 3 characterized by that it further comprises an adding unit for summing up two or more of output signals of said plurality of driving units connected to said plurality of electrodes, and that one electrode is driven by a signal resulting from said summing up by said adding unit.

(supplementary note 8) The Mach-Zehnder type optical modulator according to supplementary note 7, further comprising amplitude adjustment units, for adjusting signal amplitudes, between said adding unit and said plurality of driving units connected to said adding unit as its preceding stage, wherein each of the amplitude adjustment units transmits a signal after optionally adjusting the amplitude of the signal.

(supplementary note 9) A method for controlling a Mach-Zehnder type optical modulator, said Mach-Zehnder type optical modulator comprising a beam splitting unit for splitting input light into two component light beams, a first and a second waveguides for guiding respective ones of the split component light beams, and a beam combining unit for combining together the component light beams guided respectively by said first and second waveguides and outputting the combined light, being provided with a plurality of electrodes for applying voltages for modulation of one or both of the component light beams guided respectively by said first and second waveguides, along said first and second waveguides, and comprising a plurality of driving units which are connected to respective ones of said electrodes and apply predetermined voltages to respectively connected said electrodes, in accordance with magnitude relationships between the voltage of an input signal and respective ones of threshold values set at different values.

(supplementary note 10) The method for controlling a Mach-Zehnder type optical modulator according to supplementary note 9, wherein said threshold values set at different values are set to have a mutual relationship where they do not increase at equal intervals when they are lined up in ascending order.

(supplementary note 11) The method for controlling a Mach-Zehnder type optical modulator according to supplementary notes 9 or 10, wherein said threshold values set at different values are set in a manner to set the relationships between said amplitude of an input signal and phases given respectively to the component light beams guided by said first and second waveguides to be of arcsine curves.

(supplementary note 12) An optical transmission/receiving system including an optical transmitter which outputs an optical signal modulated by a Mach-Zehnder type optical modulator, a transmission line on which said optical signal propagates, and an optical receiver which receives said optical signal via said transmission line, wherein said Mach-Zehnder type optical modulator: comprises a beam splitting unit for splitting input light into two component light beams, a first and a second waveguides for guiding respective ones of the split component light beams, and a beam combining unit for combining together the component light beams guided respectively by said first and second waveguides and outputting the combined light; is provided with a plurality of electrodes for applying voltages for modulation of one or both of the component light beams guided respectively by said first and second waveguides, along said first and second waveguides; and comprises a plurality of driving units which are connected to respective ones of said electrodes and apply predetermined voltages to respectively connected said electrodes, in accordance with magnitude relationships between the voltage of an input signal and respective ones of threshold values set at different values.

The present invention is not limited to the above-described exemplary embodiments, and encompasses any other embodiments obtained by modifying them in design and the like within the range not departing from the spirit of the present invention. The present invention is based upon and claims the benefit of priority from Japanese Patent Application No. 2012-102576, filed on Apr. 27, 2012, the disclosure of which is incorporated herein in its entirety by reference.

Industrial Applicability

The present invention can be widely applied to a variety of optical components and devices comprising a Mach-Zehnder type optical modulator.

Reference Signs List 100 beam splitting unit
200a, 200b waveguide
300 beam combining unit
400 electrode group
401, 402, . . . , 416, 1300a, 1300b, 420 electrode
500 driving unit group
501, 502, . . . , 516, 800 driving unit
600 comparison unit group
601, 602, . . . , 616 comparison unit
700 control unit
701, 702, . . . , 716 DAC
720 resistance dividing network
730 switch
800 amplitude adjustment unit group
801, 802, 803, 804 amplitude adjustment unit
900 threshold voltage table
1000 branching unit
1100 detection unit
1200 determination unit
1400a, 1400b adding unit
10000 transmitter
20000 receiver
30000 optical fiber
40000a, 40000b amplifier

What is claimed is:
1. A Mach-Zehnder type optical modulator comprising:
a beam splitting unit for splitting input light into two component light beams;
a first waveguide and a second waveguide for guiding respective ones of the split component light beams;
a beam combining unit for combining together the component light beams guided respectively by said first and second waveguides and outputting the combined light;
a plurality of electrodes which are formed into electrode pairs as a result of being arranged on said first and second waveguides in a symmetric and parallel manner; and
driving units for differentially driving respectively correlated ones of said electrode pairs in accordance with the magnitude relationships between the voltage of an input signal and respective ones of threshold voltages set individually for the electrode pairs, wherein, by thus being driven differentially, said plurality of electrodes each apply a voltage for modulating said input light to the waveguide on which they are arranged, and wherein said threshold voltages set individually for the electrode pairs are designed to be values which compensate for nonlinearity of the extinction characteristic of said output light.

2. The Mach-Zehnder type optical modulator according to claim 1, wherein said threshold voltages set individually for the electrode pairs are designed in a manner to set the relationships between the amplitude of said input signal and phases given respectively to the component light beams guided by said first and second waveguides to be of arcsine curves.

3. The Mach-Zehnder type optical modulator according to claim 1, further comprising a threshold voltage table in which threshold voltages set individually for the electrode pairs are registered in advance, wherein said driving units extract said threshold voltages from the threshold voltage table.

4. The Mach-Zehnder type optical modulator according to claim 1, further comprising:

a detection unit for detecting the intensity of said output light; and a control unit for determining said threshold voltages on the basis of the intensity obtained by said detection and outputting the determined threshold voltages to said driving units.

5. The Mach-Zehnder type optical modulator according to claim 4, wherein said control unit comprises DACs (Digital-to-Analog Converters), and thereby outputs threshold voltages in the form of digital signals to respectively correlated ones of said driving units.

6. The Mach-Zehnder type optical modulator according to claim 1, further comprising two adding units which are correlated respectively with two symmetrically arranged electrodes, each summing up output signals from two or more driving units, and output the summed signals respectively to the correlated electrodes.

7. The Mach-Zehnder type optical modulator according to claim 6, further comprising amplitude adjustment units which are arranged between respective ones of said adding units and said two or more driving units correlated with the adding units, and optionally adjust the amplitudes of signals outputted from said two or more driving units and output the adjusted signals to respective ones of said adding units.

8. A method for controlling a Mach-Zehnder type optical modulator, the Mach-Zehnder type optical modulator comprising:

a beam splitting unit for splitting input light into two component light beams;

a first waveguide and a second waveguide for guiding the split component light beams;

a beam combining unit for combining together the component light beams guided respectively by said first and second waveguides; and a plurality of electrodes which are formed into electrode pairs as a result of being arranged on said first and second waveguides in a symmetric and parallel manner, the method comprising:

differentially driving each of said electrode pairs in accordance with the magnitude relationship between the voltage of an input signal and a corresponding one of threshold voltages set individually for said electrode pairs; and by thus differentially driving each of said electrode pairs, applying voltages for modulating said input light to the waveguides on which the electrode pairs are arranged, wherein said threshold voltages set individually for the electrode pairs are designed to be values which compensate for nonlinearity of the extinction characteristic of said output light.

9. An optical transmission/reception system including:

an optical transmitter comprising a Mach-Zehnder type optical modulator according to claim 1, which outputs an optical signal modulated by the Mach-Zehnder type optical modulator;

a transmission line on which said optical signal propagates; and an optical receiver which receives said optical signal via said transmission line.

* * * * *